(12) United States Patent
Sakaguchi et al.

(10) Patent No.: US 6,406,639 B2
(45) Date of Patent: Jun. 18, 2002

(54) METHOD OF PARTIALLY FORMING OXIDE LAYER ON GLASS SUBSTRATE

(75) Inventors: Koichi Sakaguchi, Osaka; Osamu Ishii, Ibaraki; Yasunori Shiraishi, Osaka, all of (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 69 days.

(21) Appl. No.: 09/809,287

(22) Filed: Mar. 16, 2001

Related U.S. Application Data

(63) Continuation-in-part of application No. 09/308,843, filed on May 26, 1999, now Pat. No. 6,231,924.

(30) Foreign Application Priority Data

Nov. 26, 1996 (JP) ............................................. 8-314614
Oct. 14, 1997 (JP) ............................................. 9-280818

(51) Int. Cl.$^7$ ............................................. C03C 15/00
(52) U.S. Cl. ............................ 216/24; 216/95; 216/97; 427/264; 427/266; 427/270; 427/271; 427/287
(58) Field of Search ............................... 427/264, 266, 427/270, 271, 287, 273, 269; 216/24, 96, 97, 95

(56) References Cited

U.S. PATENT DOCUMENTS

| | | | |
|---|---|---|---|
| 3,853,648 A | 12/1974 | Janus et al. | 156/7 |
| 3,935,361 A | 1/1976 | Dorfman et al. | 427/131 |
| 4,009,061 A | 2/1977 | Simon | 156/635 |
| 4,900,396 A | 2/1990 | Hayashi et al. | 427/271 |
| 4,957,601 A | * 9/1990 | Levine et al. | 156/665 |
| 4,968,361 A | 11/1990 | Ames et al. | 427/127 |
| 5,190,596 A | * 3/1993 | Timsit | 148/23 |
| 5,750,202 A | 5/1998 | Romano et al. | 427/376.4 |

FOREIGN PATENT DOCUMENTS

| | | | |
|---|---|---|---|
| DE | 4318178 A1 | 12/1994 | |
| EP | 0 412812 A1 | 2/1991 | |
| EP | 0 838442 A1 | 4/1998 | |
| GB | 724088 | 2/1955 | |
| JP | 57140339 | 3/1982 | |
| JP | 57-140339 | 8/1982 | ............ C03C/15/00 |
| JP | 62-112481 | 5/1988 | ............ C04B/41/89 |
| SU | 529996 A | 1/1977 | |
| WO | WO 95/34608 | 12/1995 | |

OTHER PUBLICATIONS

Perry's Chemical Engineers' Handbook, 6$^{th}$ ed., pp. 3–14 and 3–18, 1973, (No month).

* cited by examiner

*Primary Examiner*—Shrive P. Beck
*Assistant Examiner*—Kirsten A. Crockford
(74) *Attorney, Agent, or Firm*—Sughrue Mion, PLLC

(57) ABSTRACT

A method of partially forming oxide layers on a surface of a glass substrate by forming an oxide layer on the surface of the substrate, partially contacting the surface of the oxide layer formed on the substrate with a paste comprising an inorganic compound different from the oxide, organic solvents and silicon powder to partially dissolving the oxide layer with the paste, and removing the dissolved components of the layer together with the paste, by which the oxide layers are partially formed on the surface of the substrate efficiently and surely.

2 Claims, 2 Drawing Sheets

METHOD OF PARTIALLY FORMING OXIDE LAYER ON GLASS SUBSTRATE

CROSS REFERENCE TO THE RELATED APPLICATION

This application is a continuation-in-part application of application Ser. No. 09/308,843, filed May 26, 1999 now U.S. Pat. No. 6,231,924, entitled "METHOD OF PARTIALLY FORMING OXIDE LAYER", now pending.

FIELD OF THE INVENTION

The present invention belongs to a technical field of a glass substrate having formed thereon an oxide layer, which is used for automobiles, buildings, various industrial instruments, etc. Particularly, the invention belongs to a technical field of a glass substrate having formed an oxide layer on the necessary portions only of the surface thereof.

BACKGROUND OF THE INVENTION

On the surface of a glass plate or a ceramic plate, oxide layers having various functions according to the use are formed. For example, as glasses used for automobiles, vehicles, buildings, etc., a heat-reflective layer containing the oxide of titanium, cobalt, etc., is generally used for the purpose of reducing the cooling load, etc. Also, as glass substrates for various displays, an electrically conductive film comprising tin oxide, etc., is used from the necessity of element driving. These layers are frequently formed on only parts of the surface of a substrate for the necessity of each use described above.

In not only the use of display but also other uses of automobiles, buildings, etc., there is a case of requiring that the layer is partially formed. For example, in the case of using a heat-reflective glass for the back window of automobile, it is required that a layer is not formed on the glass surface adjacent to a high-mount stop lamp disposed in the inside of the back window of the automobile but a layer is formed on other portion of the glass surface for shielding heat rays while ensuring visibility of the lamp.

In such a case, a method of foaming the layer after previously applying masking to the necessary portion of the glass plate or a method of applying masking after forming a layer on the whole glass plate and removing the remaining unmasked portion of layer with a solvent, by releasing, or polishing, etc., is employed.

However, according to the conventional methods as described above, masking is required in any method, which is accompanied by complicated steps and operations, and thus the effective and ensure partial formation of layer has been difficult by the conventional methods.

SUMMARY OF THE INVENTION

The present invention has been made to overcome the above-described problems.

Accordingly, an object of the present invention is to provide a method of partially forming a layer on a surface of a glass substrate by a simple and ensure method.

According to the present invention, the above-described object can be attained by the method of partially forming an oxide layer on a surface of a glass substrate, consisting essentially of:

(a) a step of forming a layer comprising an oxide on the surface of the glass substrate;

(b) a step of contacting a fixed portion of the oxide layer of step (a) with a paste comprising an inorganic compound, organic solvents, and silicon powder in order to dissolve the oxide layer of step (a) with the paste, wherein said inorganic compound is not the same as the oxide of step (a); and (c) a step of removing the dissolved portion of the oxide layer from step (b) together with the paste.

The preferred embodiments of the present invention are as follows.

(1) The melting point of the inorganic compound is 500° C. or lower or the softening point thereof is 500° C. or lower.

(2) The dissolving step is a step of carrying out the dissolution by heating a fixed portion of the oxide layer together with the paste.

(3) The inorganic compound used in the paste includes at least one kind selected from the group consisting of phosphorus compounds each containing oxygen as a constituent and boron compounds each containing oxygen as a constituent.

(4) The phosphorus compound includes at least one kind selected from the group consisting of phosphoric acid and phosphates and the boron compound includes boric acid and borates.

(5) The inorganic compound is a glass and contains at least one kind selected from the group consisting of $P_2O_5$, PbO, $B_2O_3$, ZnO, and $Bi_2O_3$ as the constituent.

Figure 1:
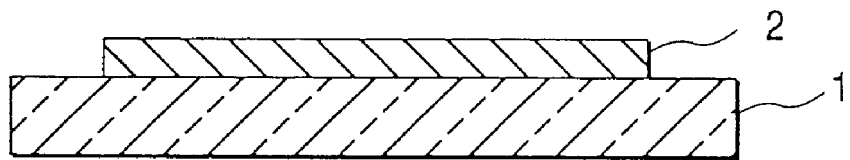
FIG. 1 is schematic views showing one embodiment of the present invention from the direction of the cross-section of a substrate.
Figure 1:
Figure 1:
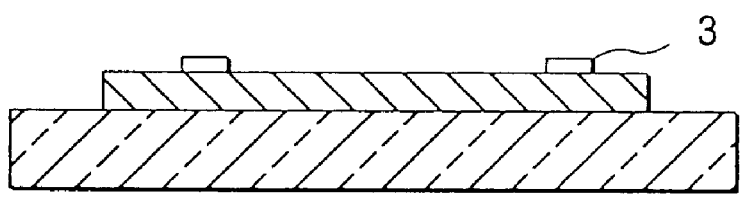
Figure 1:
Figure 1:
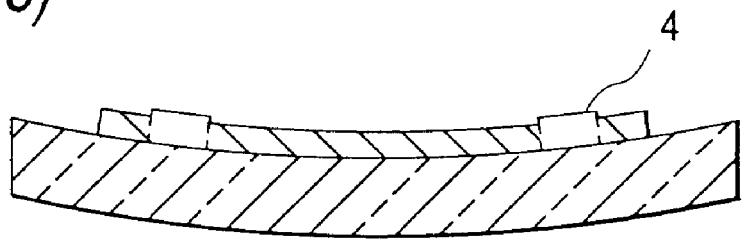
Figure 1:
Figure 1:
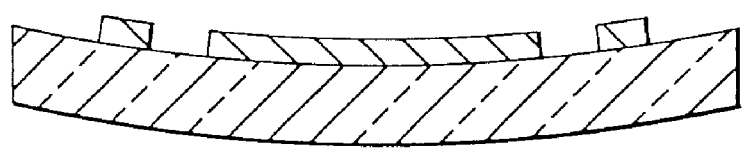

1: Glass substrate
2: Oxide layer
3: Paste containing an inorganic compound
4: Dissolved layer portion
5: Layer-removed portion
6: Back window for automobile

DETAILED DESCRIPTION OF THE INVENTION

The present invention is described in detail below.

The inorganic compound used in the paste of the present invention may be an inorganic compound which can dissolve the oxide of the layer when the compound is contacted with the oxide constituting the layer and further the contacted layer is heated and can keep the structure and the physical characteristics of the glass substrate, and can be properly selected according to the properties of the layer and the substrate.

A method of removing the paste containing the inorganic compound after dissolving the layer includes a physical means and a chemical means. For example, the physical means includes wiping off, blowing off, etc., and the chemical means includes dissolving of the layer with a solvent, etc. A preferred embodiment of a preferred removing means of a layer is cleaning with an organic solvent such as alcohols (e.g., methanol and ethanol) followed by drying and as the case may be, the means can be carried out together with the above-described physical means.

In the present invention, it is preferred that about the layer to be removed, which corresponds to the region of existing the paste contacted with the layer, all the layer of the corresponding region is removed, but the residue of the layer to an extent of not preventing the visibility can be allowed in this invention.

Examples of the inorganic compounds which are generally used in this invention are phosphorus compounds containing oxygen as the constituent, boron compounds containing oxygen as the constituent, etc., each having a melting point of 500° C. or lower and being a liquid at normal temperature. Prefered examples thereof are phosphoric acids, phosphates, boric acid, and borates satisfying the above-described conditions as shown below. The phosphoric acid in this invention means the general names of the acids formed by the hydration of diphosphorus pentoxide and includes orthophosphoric acid ($H_3PO_4$, liquid at room temperature), pyrophosphoric acid ($H_4P_2O_7$, liquid at room temperature), triphosphoric acid ($H_5P_3O_{10}$, liquid at room temperature), etc. Also, practical examples of the phosphate include sodium dihydrogenphosphate ($NaH_2PO_4$) (typically, dihydrate: $NaH_2PO_4 \cdot 2H_2O$, melting point 60° C.) and potassium dihydrogenphosphate ($KH_2PO_4$, melting point 96° C.). The borates practically include boric acid ($H_3BO_3$, melting point 185° C.), etc.

The inorganic compound having a melting point of 500° C. or lower also includes glasses. Examples of the glass preferably includes glasses having generally a low-melting point composition (so-called low-melting glasses), and the glasses containing $P_2O_5$, $B_2O_3$, ZnO, PbO, $Bi_2O_3$, etc., are more preferred. Practically, the glass composition series such as an $R_2O$—$P_2O_5$ series, an $R_2O$—$B_2O_3$ series, a PbO—$B_2O_3$—ZnO series, a PbO—$SiO_2$—$B_2O_3$ series, a $Bi_2O_3$—ZnO—$B_2O_3$ series, an $R_2O$—ZnO—$SiO_2$—$B_2O_3$ series, a ZnO—$B_2O_3$ series, an $R_2O$—ZnO—$P_2O_5$ series (wherein, R represents an alkali metal such as Na, K, etc.), etc., can be suitably used.

The characteristic of the present invention is that by contacting the paste containing the inorganic compound with the oxide constituting the layer, the layer is dissolved. To practice the dissolution of the layer, it is more preferred that the paste is contacted with only a portion of the surface of the layer to proceed dissolution of the layer.

The layer is preferably dissolved by heating in the state that the paste is contacted with the oxide constituting the layer. To conduct the dissolution of the layer, it is more preferred to contact the paste with only a part of the surface of the layer to proceed the dissolution of the layer by heating.

The method of selectively contacting the paste with a part of the layer is, for example, that the paste obtained by mixing the inorganic compound, an organic solvent, silicon powder, and the like is coated on a part of the surface of the layer.

After contacting the paste with a part of the surface of the layer by the above method, the glass substrate is generally heated (as the case may be, only the circumference of the paste thus applied is heated). When the inorganic compound used in the paste is a solid, the inorganic compound is melted by a heating step. Before melting the inorganic compound, the paste is usually fluidized and deposited on the surface of the layer.

There is no particular limitation on the organic solvent used. However, a water-soluble organic solvent is preferably used. Preferred example of the water-soluble organic solvent is a mixture of one kind of water-soluble resins (such as a modified ethyl cellulose resin, a modified polyamide resin, or polymers of n-vinylpyrrolidone) and one kind of water-soluble solvents (such as oxyethylene glycol ether, propylene glycol, or propylene glycol ether). The mixing ratio of the resins in the mixture is appropriately controlled according to the kinds and the amounts of the inorganic compound, the silicon powder, etc.

When the inorganic compound is a liquid substance, the compound can selectively be contacted with the desired portion(s) of the surface of the layer without need of a heating step. Further, when the inorganic compound is a liquid substance, it is possible to previously heat the paste containing the liquid inorganic compound, directly spray the heated paste, and dissolve the desired portions of the layer by dropping, etc. In this case, it is preferred to heat the glass substrate to the same temperature as the temperature of heating the paste, from the point of preventing the glass substrate from being broken by heating.

Considering the heat efficiency in the heating step as described above, when the inorganic compound is a solid, the melting point thereof is generally preferably low. For example, when the glass substrate is a glass plate, it is required that the melting point of the inorganic compound is lower (when a soda-lime glass is used as the substrate, 735° C. or lower) than at least the softening point (the temperature at which the viscosity is $4.5 \times 10^7$ poise) of the glass. In addition, when a glass is used as the inorganic compound, it is required that the softening point of the glass is lower than the softening point of the glass constituting the substrate. The softening point of the inorganic compound or the softening point of a glass is preferably 500° C. or lower, more preferably 350° C. or lower, and most preferably 200° C. or lower, from the points of energy saving and the ease of handling.

There is no particular limitation on the glass substrate used in this invention, but a glass plate is suitable. There is also no particular limitation on the glass plate and the plates of a borosilicate glass, an aluminosilicate glass, and various kinds of crystallized glasses can be used. Typically the plate of a soda silicate glass (soda-lime silica glass) is used.

The oxide layer that can be used is a film which functions as a heat-reflective film, a heat-absorbing film, a colored film, an electrically conductive film, etc. The oxide layer may contain, in addition to the oxide, a nitride, a carbide, a metal, etc., in the range of not reducing the objects of this invention.

For example, the heat-reflective film includes a film comprising the oxide of at least one element of cobalt, nickel, chromium, iron, titanium, tin, and antimony. More practically, there are a film comprising titanium oxide as the main constituent, a film comprising the oxide of a metal including cobalt as the main constituent, a film comprising the oxides of tin and antimony as the main constituents, etc. The heat-reflective film may further appropriately contain silicon, aluminum, zinc, copper, indium, bismuth, vanadium, manganese, zirconium, etc., in addition of the above-described element, in order to decrease the reflectance and finely control the color tone.

The electrically conductive film includes a film comprising tin oxide having trace components (one or two or more of chlorine, fluorine, antimony, etc.) added thereto, and a film consisting essentially of indium oxide or comprising indium oxide containing tin, a film comprising zinc oxide having trace components (e.g., aluminum).

The method of forming a layer from an oxide, that can be used includes a sputtering method, a vacuum vapor deposition method, a liquid-phase film-forming method, etc., and also includes a so-called thermal decomposition method, that is, a method of forming an oxide film on the surface of a substrate by thermally decomposing a raw material compound on the surface of a high-temperature glass plate and oxidizing. The thermally decomposing method that can be used includes a method of coating a metal compound on the surface of a substrate followed by burning, a method of sending the vapor of a metal compound onto a substrate heated to a high temperature (CVD method), and a method of blowing a solution or a dispersion obtained by dissolving or dispersing a metal compound in an organic solvent as fine liquid droplets (splaying method).

The step of forming the oxide layer is preferably a step of forming a layer on the surface of a glass ribbon in a floating production method. A method of continuously forming an oxide layer on the surface of a glass ribbon by a thermal decomposition method in a float process is a preferred film-forming method in the production efficiency because the remaining heat of the glass melt can be utilized for the formation of the layer. However, a simple method of patterning by partially removing a layer has not yet been found. The present invention can be particularly suitably performed for such film-formation.

Figure 2:
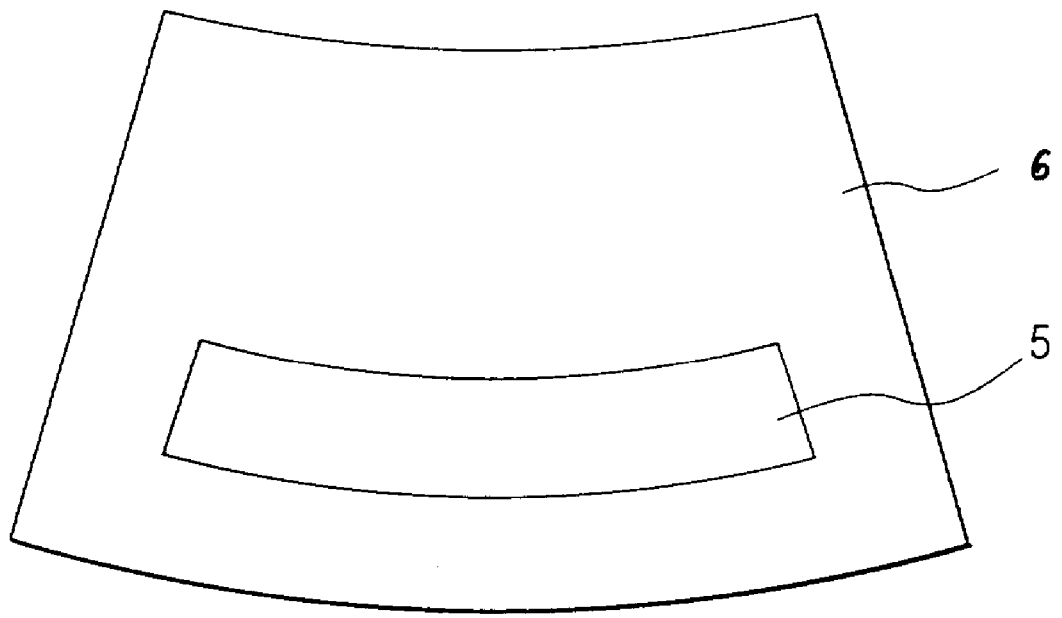
FIG. 2 is a schematic view showing an embodiment in the case of applying the present invention to a back window of an automobile.

One embodiment of the present invention is explained by referring to FIG. 1. An oxide layer is formed on the surface of a glass plate 1 (FIG. 1 (a)). A paste 3 obtained by adding an organic solvent to an inorganic compound is placed on definite portions of the surface of the layer 12 (FIG. 2 (b)). If desired and necessary, the paste may further be diluted with an organic solvent. Propylene glycol is preferably used as such organic solvent for dilution. The glass plate 1 is then heated to fluidize the paste 3 and the inorganic compound contained therein is contacted to the surface of the layer in a molten state. The inorganic compound dissolves the layer, whereby the dissolved portions become the state that the dissolved components of the layer are intermixed in the inorganic compound (FIG. 1 (c)). Together with the heating step described above, a bending work is applied to the heated glass plate 1 to make a definite form. The heated glass plate 1 is quenched to cause a compression stress on the surface to provide a so-called tempered glass. Finally, when the substrate is immersed in a liquid or washed with a liquid, the inorganic compound having intermixed therein the dissolved components of the layer is dissolved in the liquid. By this, the layer of the portions is removed, and as a result, the layers are partially formed on the surface of the molded and tempered glass 1.

In the above embodiment, the case that the inorganic compound is solid at room temperature is described, but when the inorganic compound is a liquid substance at room temperature, such as phosphoric acid, etc., the embodiment of this case is also the same as above except that the inorganic compound is in a liquid state before the heating step.

When a glass plate is used as the glass substrate as in the embodiment of the present invention shown in FIG. 1, tempering and/or a bending work of the glass plate can be conducted by utilizing the heating step when dissolving the inorganic compound and the layer. If melting of the layer and the secondary work of a glass plate as described above are conducted by the same heating step, the production method is very advantageous in the production efficiency. The tempered and bending worked glass plate is useful as a glass for automobile and, in particular, when only the portion of the layer necessary for the visibility of a high-mount stop lamp is removed, the glass becomes useful as a glass for a back window of automobile (see, FIG. 2). The oxide layer in this case can be a heat-reflective film.

The present invention is described in more detail below by reference to the following example, but it should be understood that the invention is not construed as being limited thereto.

EXAMPLE 12.5 g of dipropionylmethane of trivalent cobalt, 0.62 g of acetyl acetonate of trivalent iron and 1.83 g of acetyl acetonate of chromium were dissolved in 100 ml of toluene to prepare a raw material solution.

One surface of a glass substrate having a size of 150× 150×3.4 mm was spray coated with the raw material solution to form an oxide layer. This oxide layer functions as a heat-reflective layer.

Phosphoric acid (orthophosphoric acid), an organic solvent and silicon powder were mixed in a weight ratio of 3:2:5, respectively, to prepare paste for dissolving an oxide layer. The oraganic solvent used was composed of propylene glycol as a main component, 1,2-propanediol, an amide resin and a cellulosic resin.

This paste was applied to a part of the surface of the oxide layer formed on the glass substrate by a screen printing. The glass substrate was placed in an oven and then heat treated at 260° C.

After cooling the glass substrate, the paste applied was removed by jet water washing. As a result, the oxide layer was completely removed on the portion of the glass substrate to which the paste was applied. Thus, the heat refractive layer could partially be formed on the glass substrate.

The glass substrate thus obtained had a visible light transmittance (by light source A) of 81% at the oxide layer-removed portion and 31% at the oxide layer-remaining portion.

Thus, when a paste is prepared using silicon powder as a solid powder as in the above Example, applying the paste can well conducted by screen printing, which is preferable.

According to the present invention, after forming an oxide layer on a glass substrate, partial formation of the oxide layer can efficiently and surely be performed without need of masking accompanied by a complicated step and a troublesome operation. By such a partial formation of the oxide layer, functions such as an electrically conductive property, a heat-reflective property, etc., can be simply imparted to the surface of a glass substrate.

What is claimed is:

1. A method of partially forming an oxide layer on a surface of a glass substrate, consisting essentially of:

(a) a step of forming a layer comprising an oxide on the surface of the glass substrate;

(b) a step of contacting a fixed portion of the oxide layer of step (a) with a paste comprising an inorganic compound, organic solvents, and silicon powder in order to dissolve the oxide layer of step (a) with the paste, wherein said inorganic compound is not the same as the oxide of step (a); and (c) a step of removing the dissolved portion of the oxide layer from step (b) together with the paste.

2. The method of partially forming oxide layers as claimed in claim 1, wherein said inorganic compound is phosphoric acid.

* * * * *